(12) United States Patent
Ghosh

(10) Patent No.: US 9,184,919 B2
(45) Date of Patent: Nov. 10, 2015

(54) SYSTEMS AND METHODS FOR GENERATING AND USING MULTIPLE PRE-SIGNED CRYPTOGRAPHIC RESPONSES

(75) Inventor: Dipankar Ghosh, Charles Town, WV (US)

(73) Assignee: VERISIGN, INC., Reston, VA (US)

( * ) Notice: Subject to any disclaimer, the term of this patent is extended or adjusted under 35 U.S.C. 154(b) by 660 days.

(21) Appl. No.: 13/530,951

(22) Filed: Jun. 22, 2012

(65) Prior Publication Data

US 2013/0346746 A1   Dec. 26, 2013

(51) Int. Cl.
| | |
|---|---|
| *H04L 29/06* | (2006.01) |
| *H04L 9/32* | (2006.01) |
| *H04L 29/12* | (2006.01) |

(52) U.S. Cl.
CPC .......... *H04L 9/3268* (2013.01); *H04L 63/0823* (2013.01); *H04L 61/1511* (2013.01)

(58) Field of Classification Search
CPC ............ H04L 61/1511; H04L 63/0823; H04L 9/3268
USPC ........................................................ 713/158
See application file for complete search history.

(56) References Cited

U.S. PATENT DOCUMENTS

| | | | |
|---|---|---|---|
| 7,565,423 B1 | 7/2009 | Fredricksen | |
| 7,814,315 B2 | 10/2010 | Parkinson | |
| 2002/0144121 A1* | 10/2002 | Ellison et al. | 713/176 |
| 2003/0079125 A1* | 4/2003 | Hope et al. | 713/156 |
| 2010/0100565 A1* | 4/2010 | Adachi | 707/781 |
| 2010/0332680 A1 | 12/2010 | Anderson et al. | |
| 2011/0161663 A1* | 6/2011 | Nakhjiri | 713/158 |

OTHER PUBLICATIONS

European Search Report dated Oct. 4, 2013 issued in European Patent Application No. 13171731.6 filed Jun. 23, 2013, pp. 1-5.
Colajanni et al., "Adaptive TTL Schemes for Load Balancing of Distributed Web Servers", Association for Computing Machinery, Performance Evaluation Review, vol. 25, Issue 2, Sep. 1997.

\* cited by examiner

*Primary Examiner* — William Goodchild
(74) *Attorney, Agent, or Firm* — MH2 Technology Law Group, LLP

(57) ABSTRACT

Systems and methods are disclosed for generating and using multiple pre-signed cryptographic responses. In one implementation, the method includes generating multiple cryptographic datasets. Each cryptographic dataset has a different validity period. The method further includes upon a user request, identifying one or more cryptographic datasets that are still valid among the multiple cryptographic datasets. The method further includes identifying a cryptographic dataset having the shortest validity period among the one or more cryptographic datasets that are still valid. The method also includes providing the identified cryptographic dataset to the user.

20 Claims, 5 Drawing Sheets

400

| RESPONSE NUMBER | CERTIFICATE ID | RESPONSE VALID FROM | RESPONSE VALID TO |
|---|---|---|---|
| 100 | 1CA0 | January 1, 2008 10:00 AM | January 3, 2008 10:00 AM |
| 101 | 1CA0 | January 3, 2008 10:00 AM | January 5, 2008 10:00 AM |
| 102 | 1CA0 | January 5, 2008 10:00 AM | January 7, 2008 10:00 AM |

200

| CA table (policy enhanced) | | |
|---|---|---|
| Column | Type | Notes |
| CA ID | NUMBER | Primary key |
| VALIDITY PERIOD | NUMBER | Validity interval, in seconds, of OCSP responses for all certificates issued by the CA |
| NUMBER OF RESPONSES | NUMBER | The number of OCSP responses generated each with the TTL policy set in VALIDITY PERIOD. |

210 — CA ID
220 — VALIDITY PERIOD
230 — NUMBER OF RESPONSES

| OCSP table | | |
|---|---|---|
| Column | Type | Notes |
| RESPONSE NUMBER | NUMBER | Primary key |
| CERTIFICATE ID | VARCHAR | Certificate serial number |
| RESPONSE VALID FROM | NUMBER | Date of response production, expressed as a time_t. |
| RESPONSE VALID TO | NUMBER | Date of response expiration, expressed as a time_t. |
| RESPONSE VALUE | BLOB | The OCSP response with a hash function |

310 — RESPONSE NUMBER
320 — CERTIFICATE ID
330 — RESPONSE VALID FROM
340 — RESPONSE VALID TO
350 — RESPONSE VALUE

FIG. 3

| RESPONSE NUMBER | CERTIFICATE ID | RESPONSE VALID FROM | RESPONSE VALID TO |
|---|---|---|---|
| 100 | 1CA0 | January 1, 2008 10:00 AM | January 3, 2008 10:00 AM |
| 101 | 1CA0 | January 3, 2008 10:00 AM | January 5, 2008 10:00 AM |
| 102 | 1CA0 | January 5, 2008 10:00 AM | January 7, 2008 10:00 AM |

SYSTEMS AND METHODS FOR GENERATING AND USING MULTIPLE PRE-SIGNED CRYPTOGRAPHIC RESPONSES

DESCRIPTION OF THE INVENTION

1. Field

This disclosure is generally directed to systems and methods for generating and using multiple pre-signed cryptographic responses. More specifically, the disclosure is directed to systems and methods for generating and using multiple pre-signed responses with different Time-To-Live (TTL) periods.

2. Background

Services, such as the Domain Name System ("DNS") or Online Certificate Status Protocol ("OCSP") usually pre-sign cryptographic responses to avoid the relatively expensive signing operation in response to a request. Each pre-signed response is given a validity interval so that users do not need to re-validate certificate status every time they visit a site. This validity period is known as the TTL of the response. For example, TTL may be set to seven days for issued SSL certificates.

While a relatively long TTL improves system efficiency by avoiding re-signing a response too often, it also exposes the service to a higher risk of being attacked. Using the OCSP service as an example, when a user visits a secure site, e.g., an online payment processing site, that user is presented with an issued certificate when establishing a connection. The browser will detect that the certificate presented is indeed a legitimate issued certificate, but will not know whether the certificate has been revoked by the issuer without directly consulting issuer. Once the user has determined that the certificate is not revoked using OCSP, the certificate revocation status is maintained at the user's browser for the duration of the TTL, e.g., 7 days. If the user visits the secure site again within 7 days, the revocation status is not checked again until after the TTL.

The TTL, therefore, is the longest amount of time before every user visiting a secure site whose certificate is revoked notices that a certificate is revoked. Since revocation happens only under extreme events, typically key compromise or theft, revoking a certificate represents an action that the owner of the certificate would want everyone to know right away. If it takes a long time for everyone to recognize that a certificate has been revoked, whatever nefarious activity that prompted the certificate revocation can continue.

Therefore, there exists a need for systems and methods to provide cryptographic responses with TTLs that balance between efficiency and security.

SUMMARY

Systems and methods are disclosed for generating and using multiple pre-signed cryptographic responses. In one aspect, a computer-implemented method is disclosed. In one implementation, the method includes generating multiple cryptographic datasets. Each cryptographic dataset has a different validity period. The method further includes upon a user request, identifying one or more cryptographic datasets that are still valid among the multiple cryptographic datasets. The method further includes identifying a cryptographic dataset having the shortest validity period among the one or more cryptographic datasets that are still valid. The method also includes providing the identified cryptographic dataset to the user.

In another aspect, a system is disclosed. In one implementation, the system includes a generator configured to generate multiple cryptographic datasets. Each cryptographic dataset has a different validity period. The system further includes a server. The server is configured to, upon a user request, identify one or more cryptographic datasets that are still valid among the multiple cryptographic datasets. The server is further configured to identify a cryptographic dataset having the shortest validity period among the one or more cryptographic datasets that are still valid. The server is also configured to provide the identified cryptographic dataset to the user.

Consistent with other disclosed embodiments, computer-readable media, such as CD, RAM, ROM, or other storage devices, may store program instructions that are executable by one or more processors to implement any of the methods disclosed herein.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated into and constitute a part of this specification, illustrate several embodiments and, together with the description, serve to explain the disclosed principles. In the drawings:

FIG. 2 is a table showing an exemplary enhanced Certificate Authority (CA) policy for generating multiple OCSP responses, consistent with disclosed embodiments;

FIG. 3 is a table showing an exemplary data model for an OCSP response, consistent with disclosed embodiments;

FIG. 4 is a table showing an exemplary set of multiple OCSP responses corresponding to a same serial number, consistent with disclosed embodiments.

DESCRIPTION OF THE EMBODIMENTS

Disclosed embodiments provide methods and systems for generating and using multiple pre-signed responses with different validity periods (e.g., with different TTLs). Disclosed embodiments may be adaptable to any services that use pre-signed cryptographic responses, certificates, or signatures. In particular, for example, the methods and systems may be implemented on an OCSP certificate system, or a DNS server.

Reference will now be made in detail to exemplary embodiments, examples of which are illustrated in the accompanying drawings. Wherever convenient, the same reference numbers will be used throughout the drawings to refer to the same or like parts.

Figure 1:
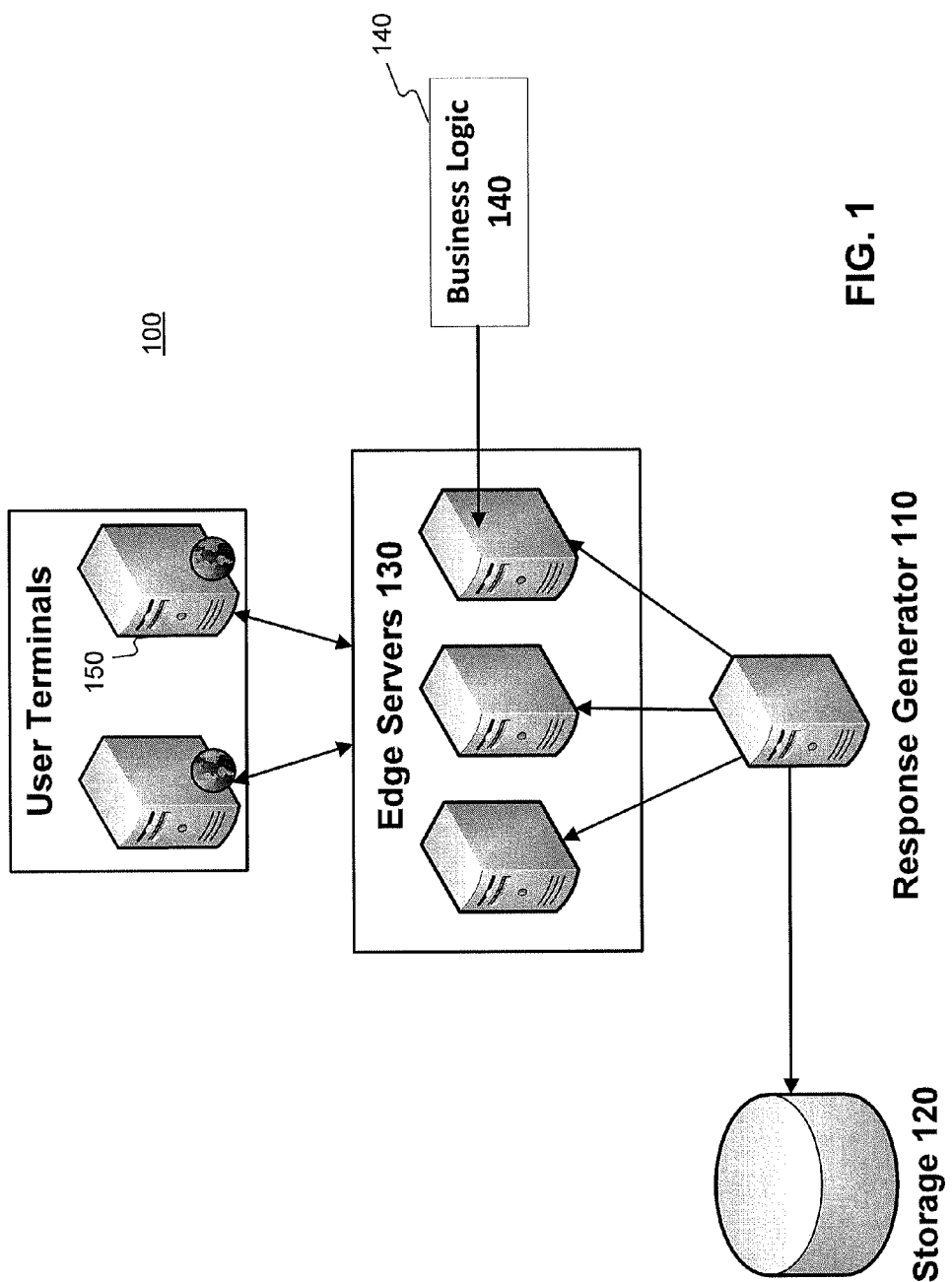
FIG. 1 is a diagram illustrating an exemplary system, consistent with disclosed embodiments.

FIG. 1 is a diagram illustrating an exemplary system 100, consistent with disclosed embodiments. In one embodiment, system 100 may be an OCSP certificate verification system. OCSP is an Internet protocol used for obtaining the revocation status of a digital certificate. For example, system 100 may be used to ensure that a user's public key infrastructure certificate is valid.

In general, when a user attempts to access a server, OCSP sends a request for certificate status information. The server sends back a response of "current," "expired/revoked," or "unknown." The protocol specifies the syntax for communication between the server (which contains the certificate status) and the client application (which is informed of that status). OCSP allows users with expired certificates a grace period (also known as a validity period), so they can access servers for a limited time before renewing. This validity period is known as the TTL of the OCSP response. The pre-signed OCSP response needs to be re-generated before the OCSP TTL expires.

In some embodiments, system 100 may include a response generator 110, such as an OCSP signing infrastructure, configured to generate pre-signed OCSP responses. Consistent with some embodiments, response generator 110 may generate two or more responses for each certificate. These OCSP responses may each have a different TTL.

In some embodiments, response generator 110 may enable a per-Certificate Authority (CA) policy to allow generation of multiple OCSP response. For example, such an enhanced CA policy may allow a shorter TTL on a higher cost, higher value certificate, and a longer TTL on a lower cost, lower value certificate. FIG. 2 is a table showing an exemplary enhanced Certificate Authority (CA) policy for generating multiple OCSP responses, consistent with disclosed embodiments.

As shown in FIG. 2, the notion of a per-CA policy is embedded in a CA table 200. It is contemplated that the table may include more or less columns and/or rows. Only the relevant columns to the TTL discussion are shown in FIG. 2. Consistent with some embodiments, CA table 200 may include a CA ID column 210, which contains a primary key for each entity in the CA table, and a VALIDITY PERIOD column 220, which specifies the TTL, in seconds, of OCSP responses. For example, the VALIDITY PERIOD may be set to 604,800 seconds, which corresponds to 7 days. Consistent with some embodiments, CA table 200 may further include a NUMBER OF RESPONSES column 230, which specifies the number of response generated each with the TTL policy set in VALIDITY PERIOD.

In one embodiment, the different OCSP responses may be valid at different times, but the valid periods of such OCSP responses may be of the same length. For example, a high value certificate may set the VALIDITY PERIOD to 3 days (259,200 seconds), and generate three responses for each certificate. The three OCSP responses may have varying validity periods, including a first validity period that expires in less than 7 days, a second validity period that expires in more than 7 days, and a third validity period that expires between the first validity period and the second validity period. For example, the first response may be set to be valid immediately and expire in 3 days, the second response may be set to be valid in 6 days and expire in 9 days, and the third response may be set to be valid in 3 days and expire in 6 days. Accordingly, with this enhanced CA policy, the system can withstand the lack of OCSP response generation for 9 days.

In one embodiment, the valid periods of the different OCSP responses may be of different lengths. For example, response generator 110 may generate three sets of OCSP response data. The first response may be set to be valid for less than 7 days, the second response may be set to be valid for longer than 7 days, and the third response may be set to be valid for a length between that of the first response and the second response.

FIG. 3 is a table 300 showing an exemplary data model for an OCSP response, consistent with disclosed embodiments. For exemplary purpose only, FIG. 3 shows an OCSP table 300 of a particular OCSP response. Table 300 may include an RESPONSE NUMBER column 310 that contains a primary key for each entity in the OCSP table and a CERTIFICATE ID 320 that specifies the certificate serial number. In some embodiments, an OCSP response may correspond to a unique certificate serial number, but a certificate serial number may correspond to more than one OCSP response.

Table 300 may further include an RESPONSE VALID FROM column 330 that denotes the date and time when the response becomes valid, and a RESPONSE VALID TO column 340 that denotes the date and time of the response expiration. Both the RESPONSE VALID FROM time and the RESPONSE VALID TO time may be expressed as a time_t format. The response may be valid from the time it is produced, or become valid at a predetermined time in the future. For example, the response may be set to be valid immediately and expire in 3 days, or valid at a future date, e.g., the third day, and expire 3 days thereafter.

Table 300 may also include information related to the algorithms used to generate the cryptographic response, such as the cryptographic hash function. For example, table 300 may include an RESPONSE VALUE column 350 for an OCSP response with a hash function. The RESPONSE VALUE column 350 may use a binary large object (BLOB) format.

Consistent with some embodiments, more than one response as shown in FIG. 3 may be generated corresponding to a same serial number, but with different RESPONSE VALID FROM and RESPONSE VALID TO times. For example, FIG. 4 is a table 400 showing such an exemplary set of multiple OCSP responses. Table 400 lists three OCSP responses for the same CERTIFICATE ID ICAO. Each OCSP response has a VALIDITY PERIOD of 2 days. The first response is valid from 10:00 am on Jan. 1, 2008, and is set to expire at 10:00 am on Jan. 3, 2008. The second response is valid from 10:00 am on Jan. 3, 2008, and is set to expire at 10:00 am on Jan. 5, 2008. The third response is valid from 10:00 am on Jan. 5, 2008, and is set to expire at 10:00 am on Jan. 7, 2008.

Although the example shown in FIG. 4 uses an identical VALIDITY PERIOD for each OCSP response and the OCSP responses are set to be valid one after another in time, the responses may be set with abutting or overlapping validity periods. In some embodiments, the responses may become valid at the same time, e.g., immediately, but set to expire at different times. For example, in table 400, all three responses may be valid from 10:00 am on Jan. 1, 2008. The first response may be set to expire at 10:00 am on Jan. 3, 2008. The second response may be set to expire at 10:00 am on Jan. 5, 2008. The third response may be set to expire at 10:00 am on Jan. 7, 2008. Accordingly, the first response may be valid for 2 days, the second response may be valid for 4 days, and the third response may be valid for 6 days.

In some embodiments, in order to accommodate the generation of multiple responses, response generator 110 may adjust or possibly replace all OCSP responses with a single new longer-lived revoked response. In some embodiments, response generator 110 may maintain the right number of responses by purging those that have expired and generating new ones expiring in the future. In some other embodiments, the generation would need to properly overlap OCSP response validity so that as an OCSP response is nearing expiration, a new OCSP response is valid and can be served. For example, the new OCSP response may be set to have a production time that is earlier than the current time, and an expiration time that is in the future.

Referring back to FIG. 1, the generated OCSP responses may be temporarily stored in a storage device 120. Consistent with some embodiments, storage device 120 may be located inside response generator 110, or as a component separate from response generator 110. In some embodiments, the multiple responses may be stored in a look-up table.

The responses may then be pushed to edge servers 130. Consistent with one embodiment, edge servers 130 may be OCSP responders. In some embodiments, edge servers 130 may include business logic 140 configured to check the validity periods of the OCSP responses. For example, business logic 140 may compare the current time with the RESPONSE VALID FROM time and RESPONSE VALID TO time of each response. If the current time is earlier than the RESPONSE VALID FROM time, business logic 140 may determine that the corresponding response is not valid yet. If the current time is later than the RESPONSE VALID FROM time, but earlier than the RESPONSE VALID TO time, business logic 140 may determine that the corresponding response is valid. If the current time is later than the RESPONSE VALID TO time, business logic 140 may determine that the corresponding response has expired and is no longer valid.

In some embodiments, edge servers 130 may provide a currently valid response to a user terminal 150 upon request. For example, a user may request, from user terminal 150, a validation of a certificate that the user holds for accessing a particular website. Upon receiving the request, edge server 130 may check the validity of the responses, and provide a response that is still valid back to user terminal 150.

In some embodiments, more than one OCSP response may be currently valid, and edge servers 130 may provide the response that has a shortest TTL to user terminal 150. For example, two OCSP responses may be generated with TTLs of 3 days and 7 days respectively. If the user request is received on the second day, both responses are valid, and the response with the shorter TTL (i.e., 3 days) may be provided to user terminal 150. Alternatively, if the user request is received on the fourth day, only the response with the 7-day long TTL is valid, and thus the longer-TTL response may be provided to user terminal 150.

Components of system 100, such as response generator 110 and edge servers 130, may be implemented in various ways. For example, each of them may be a general-purpose computer, a server, a mainframe computer, or any combination of these components. They may communicate over a link with a network, such as Internet. For example, the link may be a direct communication link, a LAN, a WAN, or other suitable connection. Consistent with some embodiments, they may each include a processor, a memory, input/output (I/O) devices, storage devices, etc.

The processor may include one or more known processing devices, such as a microprocessor from the Pentium™ or Xeon™ family manufactured by Intel™, the Turion™ family manufactured by AMD™, or any of various processors manufactured by Sun Microsystems. The memory may be configured to store information used by the processor to perform certain functions related to disclosed embodiments. The storage devices may each include a volatile or non-volatile, magnetic, semiconductor, tape, optical, removable, nonremovable, or other type of storage device or computer-readable medium.

The memory may be configured with an operating system (not shown) that performs several functions well known in the art when executed by the processor. By way of example, the operating system may be Microsoft Windows™, Unix™, Linux™, Solaris™, or some other operating system. The choice of operating system, and even the choice to use an operating system, is not critical to any embodiment.

In one embodiment, the memory may also include one or more certificate validation programs or subprograms loaded from the storage devices or elsewhere that, when executed by the processor, perform various procedures, operations, or processes consistent with disclosed embodiments. For example, the memory may include an OCSP response generation program that generates multiple OCSP responses; an OCSP resolution program that checks the validity of the responses upon request, and provide an appropriate response to the user terminal; and/or an integrative support program that links the other programs and allows them to use a common database, provides a common user interface, performs basic bookkeeping tasks, and provides user guidance and help. The memory may also include other programs that perform other functions and processes, such as programs that provide communication support, Internet access, etc.

The I/O devices may receive data from external machines and devices and output data to external machines and devices. The I/O devices may also include one or more digital and/or analog communication input/output devices that allow communication with other machines and devices. The configuration and number of input and/or output devices incorporated in I/O devices may vary as appropriate for certain embodiments.

Figure 5:
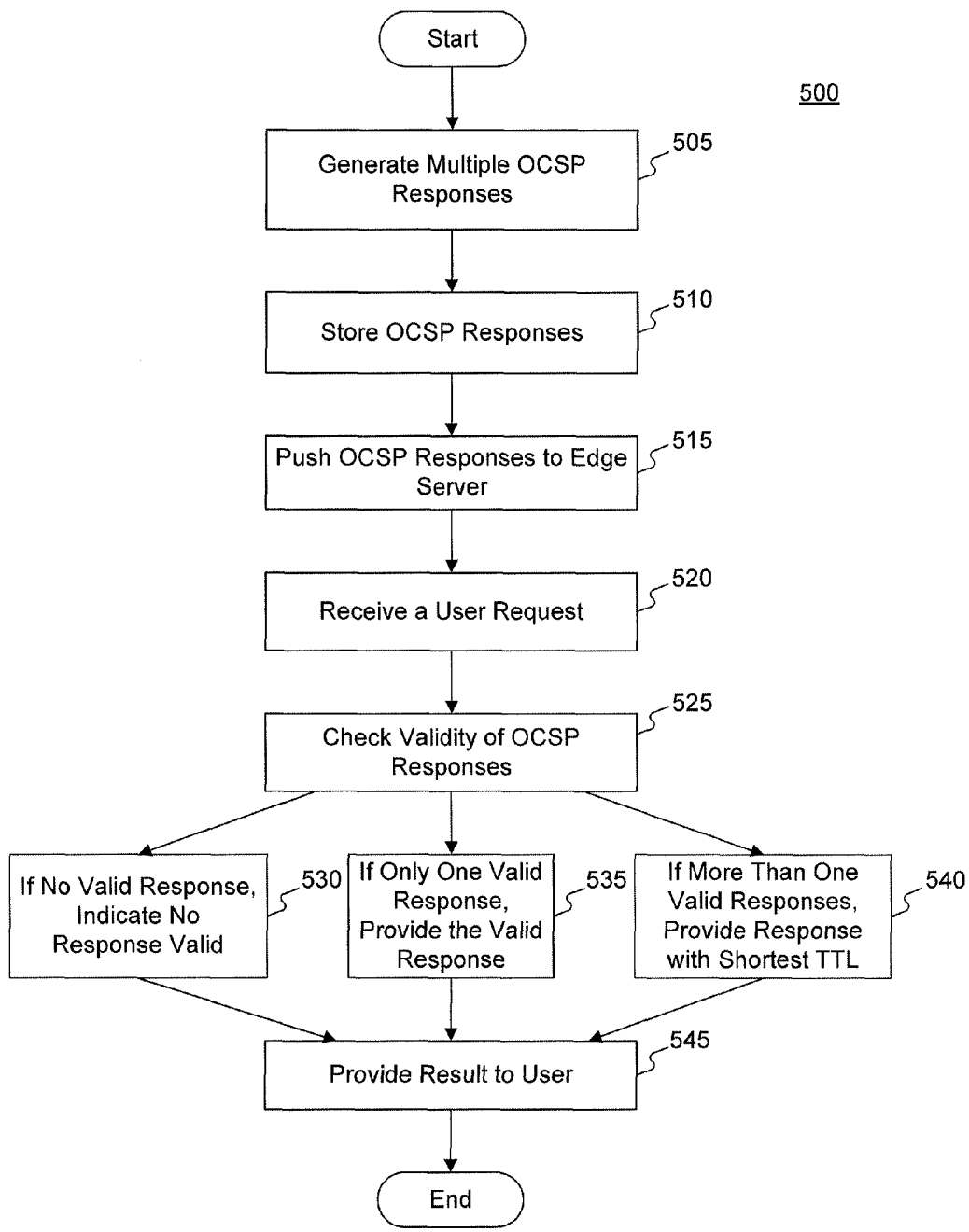
FIG. 5 is a flow diagram illustrating an exemplary process for generating and providing multiple responses, consistent with disclosed embodiments.

FIG. 5 is a flow diagram illustrating an exemplary process for generating and providing multiple responses, consistent with disclosed embodiments. In some embodiments, process 500 is a high level view of how system 100 may generate multiple OCSP responses with different validity periods and provide an appropriate response, among those generated, to a user who requested certificate verification. In certain embodiments, process 500 may be implemented by response generator 110 and edge servers 130.

In Step 505 of FIG. 5, response generator 110 may generate multiple OCSP responses for each certificate serial number based upon an enhanced CA policy. In some embodiments, these OCSP responses may be generated with identical validity periods but varying RESPONSE VALID FROM and RESPONSE VALID TO times. In some embodiments, these OCSP responses may be generated with identical RESPONSE VALID TO times, but varying validity periods. In some other embodiments, these OCSP responses may be generated to have partially overlapping validity periods.

Once the OCSP responses are generated, in Step 510 they may be stored in a look-up table in storage device 120. Optionally, process 500 may proceed from Step 510 directly to Step 515, where the multiple OCSP responses are pushed to edge servers 130 and stored in a storage component thereon. For example, the responses may be stored in a look-up table.

In Step 520, edge servers 130 may receive a user request to validate a certificate. For example, such a user request may be received from user terminal 150. Upon receiving the user request, edge servers 130 may check the validity of the multiple OCSP responses corresponding to the certificate serial number in Step 525. In some embodiments, the validity of the OCSP responses may be determined based on the production time and expiration time of each response.

In Step 530, if edge server 130 determines that no response corresponding to the certificate is currently valid, it may generate an indication that no response is valid. In Step 535, if edge server 130 determines that only one response is currently valid, it may provide that valid response as a result. Alternatively, in Step 540, if edge server 130 determines that more than one response is currently valid, it may further determine and provide the response that has the shortest remaining TTL. Finally, in Step 545, edge server 130 may provide the result to the user in response to the user request. Process 500 may terminate after Step 545.

Although FIGS. 1-5 are described above in connection with embodiments implemented for generating and providing OCSP responses, it is contemplated that the invention may be implemented for other systems that involve pre-signed cryptographic responses. For example, in another embodiment, system 100 may be a Domain Name System Security Extensions ("DNSSEC") system. DNSSEC is a suite of Internet Engineering Task Force (IETF) specifications for securing certain kinds of information provided by the Domain Name System (DNS) as used on Internet Protocol (IP) networks. It is a set of extensions to DNS, which provide to DNS users origin authentication of DNS data, authenticated denial of existence, and data integrity. All answers in DNSSEC are digitally signed. By checking the digital signature, a DNS user is able to check if the information is identical (correct and complete) to the information on the authoritative DNS server.

Accordingly, response generator 110 may be a DNSSEC signing infrastructure that generates DNS records. For example, response generator 110 may generate a set of DNS records, including, for example, RRSIG, DS, and NSEC3 records. Response generator 110 may digitally sign the DNS records for DNS lookup using public-key cryptography. Consistent with some embodiments, response generator 110 may generate multiple sets of RRSIG, DS, and NSEC3 records with different expiration timestamps specified in the RRSIG records and in the TTL fields. For example, two DNS record sets may be generated, where one timestamp may be set to 7-day, and the other timestamp may be of a shorter value such as 1-day.

The generated sets of DNS records may be stored on storage device 120 or be pushed to edge servers 130. Edge servers 130 may check the timestamps upon a user request to check a digital signature. In some embodiments, edge servers 130 may return to user terminal 150 the DNS record set that has a timestamp that is still valid. In some embodiments, if more than one DNS record set is valid, edge servers 130 may return to user terminal 150 the one that has the shortest valid period. In the example above, if the record set with the 1-day timestamp is still valid, edge servers 130 may return the shorter-TTL record set to user terminal 150. Otherwise, if the record set with the 1-day timestamp is no longer valid, but the one with the 7-day timestamp is still valid, edge servers 130 may return the longer-TTL record set to user terminal 150.

The foregoing descriptions have been presented for purposes of illustration and description. They are not exhaustive and do not limit the disclosed embodiments to the precise form disclosed. Modifications and variations are possible in light of the above teachings or may be acquired from practicing the disclosed embodiments. For example, the described implementation includes software, but the disclosed embodiments may be implemented as a combination of hardware and software or in firmware. Examples of hardware include computing or processing systems, including personal computers, servers, laptops, mainframes, micro-processors, and the like. Additionally, although disclosed aspects are described as being stored in a memory on a computer, one skilled in the art will appreciate that these aspects can also be stored on other types of computer-readable storage media, such as secondary storage devices, like hard disks, floppy disks, a CD-ROM, USB media, DVD, or other forms of RAM or ROM.

Computer programs based on the written description and disclosed methods are within the skill of an experienced developer. The various programs or program modules can be created using any of the techniques known to one skilled in the art or can be designed in connection with existing software. For example, program sections or program modules can be designed in or by means of .Net Framework, .Net Compact Framework (and related languages, such as Visual Basic, C, etc.), Python, PHP, XML, Java, C++, JavaScript, HTML, HTML/AJAX, Flex, Silverlight, or any other now known or later created programming language. One or more of such software sections or modules can be integrated into a computer system or existing browser software.

Other embodiments will be apparent to those skilled in the art from consideration of the specification and practice of the embodiments disclosed herein. The recitations in the claims are to be interpreted broadly based on the language employed in the claims and not limited to examples described in the present specification or during the prosecution of the application, which examples are to be construed non-exclusive. Further, the steps of the disclosed methods may be modified in any manner, including by reordering steps and/or inserting or deleting steps. It is intended, therefore, that the specification and examples be considered as exemplary only, with a true scope and spirit being indicated by the following claims and their full scope equivalents.

What is claimed is:

1. A computer-implemented method, comprising:
generating multiple cryptographic datasets corresponding to a single encryption key, each cryptographic dataset having a different validity period;
upon a user request, identifying one or more cryptographic datasets that are still valid among the multiple cryptographic datasets;
identifying a cryptographic dataset having a shortest validity period among the one or more cryptographic datasets that are still valid; and
providing the identified cryptographic dataset to the user in response to identifying the cryptographic dataset having the shortest validity period.

2. The method of claim 1, wherein the multiple cryptographic datasets include a first cryptographic dataset having a first validity period, and a second cryptographic dataset having a second validity period shorter than the first validity period, wherein method includes:
determining if the second cryptographic dataset has expired;
if the second cryptographic dataset has not expired, providing the second cryptographic dataset to the user; and
if the second cryptographic dataset has expired, providing the first cryptographic dataset to the user.

3. The method of claim 2, wherein the multiple cryptographic datasets further include a third cryptographic dataset having a third validity period shorter than the first validity period and longer than the second validity period, wherein the method further includes:
determining if the third cryptographic dataset has expired;
if the third cryptographic dataset has not expired, providing the third cryptographic dataset to the user; and
if the third cryptographic dataset has expired, providing the first cryptographic dataset to the user.

4. The method of claim 1, wherein the multiple cryptographic datasets are Domain Name System records.

5. The method of claim 1, wherein the multiple cryptographic datasets are Online Certificate Status Protocol pre-signed responses.

6. The method of claim 2, wherein the first validity period is longer than 7 days, and the second validity period is shorter than 7 days.

7. The method of claim 1, wherein the multiple cryptographic datasets have an identical Time-To-Live period, but different expiration times.

8. The method of claim 1, wherein the multiple cryptographic datasets have different Time-To-Live periods.

9. A system, comprising:
- a generator configured to generate multiple cryptographic datasets corresponding to a single encryption key, each cryptographic dataset having a different validity period; and
- a server configured to:
  - upon a user request, identify one or more cryptographic datasets that are still valid among the multiple cryptographic datasets;
  - identify a cryptographic dataset having a shortest validity period among the one or more cryptographic datasets that are still valid; and
  - provide the identified cryptographic dataset to the user in response to identifying the cryptographic dataset having the shortest validity period.

10. The system of claim 9, wherein the multiple cryptographic datasets include a first cryptographic dataset having a first validity period, and a second cryptographic dataset having a second validity period shorter than the first validity period, wherein the server is configured to:
- determine if the second cryptographic dataset has expired;
- if the second cryptographic dataset has not expired, provide the second cryptographic dataset to the user; and
- if the second cryptographic dataset has expired, provide the first cryptographic dataset to the user.

11. The system of claim 10, wherein the multiple cryptographic datasets further include a third cryptographic dataset having a third validity period shorter than the first validity period and longer than the second validity period, wherein the server is further configured to:
- determine if the third cryptographic dataset has expired;
- if the third cryptographic dataset has not expired, provide the third cryptographic dataset to the user; and
- if the third cryptographic dataset has expired, provide the first cryptographic dataset to the user.

12. The system of claim 9, wherein the generator is a Domain Name System Security Extensions signing infrastructure and the multiple cryptographic datasets are Domain Name System records.

13. The system of claim 9, wherein the generator is an Online Certificate Status Protocol signing infrastructure and the multiple cryptographic datasets are Online Certificate Status Protocol pre-signed responses.

14. The system of claim 10, wherein the first validity period is longer than 7 days, and the second validity period is shorter than 7 days.

15. The system of claim 9, wherein the generator is further configured to push the multiple cryptographic datasets to the server.

16. A non-transitory computer-readable medium having stored thereon instructions that, when executed by a processor, performs a method comprising:
- generating multiple cryptographic datasets corresponding to a single encryption key, each cryptographic dataset having a different validity period;
- upon a user request, identifying one or more cryptographic datasets that are still valid among the multiple cryptographic datasets;
- identifying a cryptographic dataset having a shortest validity period among the one or more cryptographic datasets that are still valid; and
- providing the identified cryptographic dataset to the user in response to identifying the cryptographic dataset having the shortest validity period.

17. The computer-readable medium of claim 16, wherein the multiple cryptographic datasets include a first cryptographic dataset having a first validity period, and a second cryptographic dataset having a second validity period shorter than the first validity period, wherein the method further comprises:
- determining if the second cryptographic dataset has expired;
- if the second cryptographic dataset has not expired, providing the second cryptographic dataset to the user; and
- if the second cryptographic dataset has expired, providing the first cryptographic dataset to the user.

18. The computer-readable medium of claim 16, wherein the multiple cryptographic datasets are Domain Name System records.

19. The computer-readable medium of claim 16, wherein the multiple cryptographic datasets are Online Certificate Status Protocol pre-signed responses.

20. The computer-readable medium of claim 17, wherein the first validity period is longer than 7 days, and the second validity period is shorter than 7 days.

* * * * *